(12) United States Patent
Mei et al.

(10) Patent No.: US 10,921,674 B2
(45) Date of Patent: Feb. 16, 2021

(54) ELECTROCHROMIC POLYMER THIN FILMS HAVING REDUCED SELF-BLEACHING BEHAVIOR AND ENHANCED CYCLING STABILITY

(71) Applicant: Furcifer Inc., Menlo Park, CA (US)

(72) Inventors: Jianguo Mei, West Lafayette, IN (US); Jiazhi He, Lafayette, IN (US); Yan Zhou, Fremont, CA (US)

(73) Assignee: Furcifer Inc., Fremont, CA (US)

( * ) Notice: Subject to any disclaimer, the term of this patent is extended or adjusted under 35 U.S.C. 154(b) by 254 days.

(21) Appl. No.: 16/032,980

(22) Filed: Jul. 11, 2018

(65) Prior Publication Data

US 2019/0086757 A1    Mar. 21, 2019

Related U.S. Application Data

(60) Provisional application No. 62/532,699, filed on Jul. 14, 2017.

(51) Int. Cl.
  *G02F 1/15* (2019.01)
  *G02F 1/155* (2006.01)
  (Continued)

(52) U.S. Cl.
  CPC ........... *G02F 1/155* (2013.01); *C08G 61/126* (2013.01); *C09K 9/02* (2013.01); *G02F 1/13439* (2013.01); *G02F 1/1533* (2013.01); *C08G 2261/149* (2013.01); *C08G 2261/314* (2013.01); *C08G 2261/3243* (2013.01); *C08G 2261/90* (2013.01); *G02F 1/15165* (2019.01); *G02F 2001/1536* (2013.01)

(58) Field of Classification Search
  CPC .... G02F 1/155; G02F 1/1533; G02F 1/13439; G02F 1/15165; G02F 2001/1536
  See application file for complete search history.

(56) References Cited

U.S. PATENT DOCUMENTS 4,973,391 A * 11/1990 Madou ...................... G02F 1/15
                                                          205/419
5,276,547 A *  1/1994 Couput ................ G02F 1/1525
                                                          359/265
(Continued)

FOREIGN PATENT DOCUMENTS

JP    2009145461 A    7/2009
TW     201009062 A    3/2010
WO   2016187265 A1   11/2016

OTHER PUBLICATIONS

Nicole Herzer et al., "Fabrication of PEDOT-OTS-patterned ITO substrates", Journal of Materials Chemistry, vol. 20, Aug. 2010, pp. 6618-6621.*

(Continued)

*Primary Examiner* — Joseph P Martinez (57) ABSTRACT

The disclosure relates generally to electrochromic devices wherein the self-bleaching behavior of an electrochromic polymer (ECP) film is suppressed, and related methods. In some embodiments, provided are ECP films on modified transparent conductive oxide substrates, such as a partially octadecyltrichlorosilane (OTS) covered indium tin oxide (ITO) substrate (POTS-ITO substrate), methods of preparing the ECP films, and electrochromic devices comprising the films.

21 Claims, 8 Drawing Sheets

(51) Int. Cl.
    *G02F 1/153*     (2006.01)
    *G02F 1/1343*     (2006.01)
    *C09K 9/02*     (2006.01)
    *C08G 61/12*     (2006.01)
    *G02F 1/1516*     (2019.01)

(56) References Cited

U.S. PATENT DOCUMENTS

| | | |
|---|---|---|
| 2010/0039690 A1 | 2/2010 | Agrawal et al. |
| 2011/0149367 A1 | 6/2011 | Nagamura et al. |
| 2015/0007371 A1 | 1/2015 | Van der Bloom et al. |

OTHER PUBLICATIONS

PCT International Search Report and the Written Opinion dated Oct. 1, 2018, issued in corresponding International Application No. PCT/US18/41679 (11 pages).

Liang Ge et al., "Anti-Icing Property of Superhydrophobic Octadecyltrichlorosilane Film and Its Ice Adhesion Strength", Journal of Nanomaterials, Apr. 2013, Article ID 278936 (5 pages).

Search Report for European Application No. 18832949.4, dated Nov. 5, 2020, 11 pages.

Search Report for Chinese Application No. 2018800432158, dated Sep. 22, 2020, 3 pages.

Li et al., "Electrochromic devices and thin film transistors from a new family of ethylenedioxythiophene based conjugated polymers", New Journal of Chemistry, Feb. 2011, vol. 35, No. 6, pp. 1327-1334.

Kodie et al., "Hot Microcontact Printing for Patterning ITO Surfaces. Methodology, Morphology, Microstructure, and OLED Charge Injection Barrier Imaging", American Chemical Society, 2003, vol. 19, No. 1, pp. 86-93.

He et al., "Self-Bleaching Behaviors in Black-to-Transmissive Electrochromic Polymer Thin Films", ACS Applied Materials & Interfaces, Sep. 2017, 25 pages.

Muthurasu, A. et al., "Electrochemical characterization of Self-assembled Monolayers (SAMs) of silanes on indium tin oxide (ITO) electrodes—Tuning electron transfer behaviour across electrode-electrolyte interface", Journal of Collid and Interface Science, 2012, vol. 374, pp. 241-249.

* cited by examiner

ELECTROCHROMIC POLYMER THIN FILMS HAVING REDUCED SELF-BLEACHING BEHAVIOR AND ENHANCED CYCLING STABILITY

CROSS-REFERENCE TO RELATED APPLICATION

This application is based on and claims priority to U.S. Provisional Application No. 62/532,699, filed Jul. 14, 2017, entitled "Method and device for suppressing self-bleaching behaviors in black-to-transmissive electrochromic polymer thin films." The entire contents of the above-referenced application are all incorporated herein by reference.

TECHNICAL FIELD

The disclosure relates generally to electrochromic devices, and more particularly, to electrochromic devices having electrochromic polymer (ECP) thin films with suppressed self-bleaching behavior.

BACKGROUND

Smart electrochromic windows have received much interest as an emergent energy-saving technology. Electrochromism refers to a reversible optical spectrum change upon an electron transfer reaction induced via an application of voltage. Electrochromic thin films which can manipulate light transmission by switching a small voltage bias to oxidize/reduce the active materials have been developed for decades. Various types of the active materials, including inorganic materials (e.g. $WO_3$, $MoO_3$, $V_2O_5$, $Nb_2O_5$, etc.), small molecules (e.g. viologens, Prussian blue, etc.), conjugated polymers and inorganic-organic hybrids have been explored. Among them, conjugated polymers present many attractive properties such as fast coloring-bleaching time, low cost, and flexibility. However, there are also a few obstacles to overcome, including cycling stability, photo-stability, optical memory, etc. Despite of considerable progresses towards a development of polymer-based electrochromics, there are still several technological hurdles.

The optical memory is the ability of an electrochromic material to maintain its colored/bleached state at an open circuit. Although conjugated polymer thin films generally have good adhesion on device electrodes, a self-bleaching behavior of conjugated polymer often exists, and it has not been fully understood. A self-bleaching behavior refers to a phenomena that an electrochromic material resumes its bleached state from a colored state with an application of voltage. The self-bleaching behavior hinders the applications of electrochromic devices (ECDs) in many scenarios. For instance, transmissivity of smart windows is required to be precisely controlled based on variations of solar radiation. Because of the self-bleaching behavior, an automatic control becomes more challenging. Therefore, it is important to understand and solve the self-bleaching behaviors of conjugated polymers.

SUMMARY

In one aspect of the present disclosure, self-bleaching behaviors of ECP-black thin films are investigated. It has been found that an electrochemical break-in process leads to a less dense morphology and increases free volume facilitating ion permeation in the ECP-black thin films. Polarized interface between a polymer thin film and a transparent indium-tin-oxide (ITO) electrode makes charge transfer accessible, which causes the self-bleaching behaviors.

In another aspect of the present disclosure, two engineering strategies are proposed to suppress the self-bleaching behaviors. First, a densely packed morphology is reformed by increasing a cathodic polarization time at open circuit ($V_{off}$). The second strategy involves modifying the substrate, such as partial modification of the electrode (ITO) surface with an octadecyltrichlorosilane (OTS) layer. A combination of the two strategies can render an ECP-black thin film capable of maintaining a colored state of at least about 300 seconds.

In another aspect of the present disclosure, a cycling stability of the ECP thin films has been improved from about 600 cycles to more than 1000 cycles or more than 2000 cycles without noticeable decay of color contrast.

In another aspect, provided is an electrochromic device (ECD) comprising an electrochromic polymer (ECP) film on a modified transparent conductive oxide substrate which is a transparent conductive oxide (TCO) substrate partially or fully covered with a modification material selected from $C_6$-$C_{24}$alkyltrichlorosilane, $TiO_2$, ZnO, $WO_3$, $MoO_3$, $V_2O_5$, NiO, $Ni_2O_3$, and $Ni_3O_4$, HMDS (bis(trimethylsilyl)amine), APTS ((3-aminopropyl)triethoxysilane), and trimethoxy(2-phenylethyl)silane, poly(vinylidene fluoride-co-hexafluoropropylene) (PVDF-HFP), poly(3,4-ethylenedioxythiophene)-poly(styrenesulfonate) (PEDOT:PSS), or a combination thereof.

In another aspect, provided is an electrochromic device (ECD) comprising an electrochromic polymer (ECP) film on a POTS-ITO substrate which is an indium tin oxide (ITO) substrate partially covered with octadecyltrichlorosilane (OTS).

In another aspect, provided is an electrochromic device (ECD) wherein the self-bleaching behavior of an electrochromic polymer (ECP) film is suppressed, the ECD comprising:
  a partially octadecyltrichlorosilane (OTS) covered indium tin oxide (ITO) substrate (POTS-ITO substrate) obtained by a method comprising immersing the ITO substrate in an OTS hexane solution for a period of time, and
  the ECP film on the POTS-ITO substrate.

In another aspect, provided is a method for suppressing a self-bleaching behavior of an electrochromic polymer (ECP) film, comprising:
  obtaining a modified transparent conductive oxide (TCO) substrate partially or fully covered with a modification material selected from $C_6$-$C_{24}$alkyltrichlorosilane, $TiO_2$, ZnO, $WO_3$, $MoO_3$, $V_2O_5$, NiO, $Ni_2O_3$, and $Ni_3O_4$, HMDS (bis(trimethylsilyl)amine), APTS ((3-aminopropyl)triethoxysilane), and trimethoxy(2-phenylethyl)silane, poly(vinylidene fluoride-co-hexafluoropropylene) (PVDF-HFP), poly(3,4-ethylenedioxythiophene)-poly(styrenesulfonate) (PEDOT:PSS), or a combination thereof; and forming the ECP film on the modified TCO substrate.

In another aspect, provided is a method for suppressing a self-bleaching behavior of an electrochromic polymer (ECP) film, comprising:
  obtaining a partially octadecyltrichlorosilane (OTS) covered indium tin oxide (ITO) substrate (POTS-ITO substrate); and
  forming the ECP film on the POTS-ITO substrate.

The ECP film that can be used in this technology can be made of any ECP, such as poly-3,4-ethylenedioxy thiophene (PEDOT), poly-2,2'-bithiophene, polypyrrole, polyaniline (PANI), polythiopene, polyisothianaphthene, poly(oaminophenol), polypyridine, polyindole, polycarbazole, polyquinone, octacyanophthalocyanine, viologen, anthraquinone, phenocyazine, or an electrochromic polymer described in U.S. Patent Application Publication No. US2017/0321002, and combinations thereof.

The electrochromic devices disclosed herein may be smart windows or display devices, e.g., anti-glare car mirrors; smart windows configured to modulate the transmission or reflected solar radiation for use in cars, aircrafts, buildings, and the like; protective eyewear; camouflage and/or chameleonic materials; etc.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several non-limiting embodiments and, together with the description, serve to explain the disclosed principles.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Unless defined otherwise, all technical and scientific terms used herein have the same meaning as is commonly understood by one of skill in the art to which this invention belongs.

As used herein, the term "comprising" is intended to mean that the compositions and methods include the recited elements, but not excluding others. "Consisting essentially of" when used to define compositions and methods, shall mean excluding other elements of any essential significance to the combination. For example, a composition consisting essentially of the elements as defined herein would not exclude other elements that do not materially affect the basic and novel characteristic(s) of the claimed invention. "Consisting of" shall mean excluding more than trace amount of other ingredients and substantial method steps recited. Embodiments defined by each of these transition terms are within the scope of this invention.

Numeric ranges are also inclusive of the numbers defining the range. Additionally, the singular forms "a", "an" and "the" include plural referents unless the context clearly dictates otherwise.

Reference throughout this specification to "one embodiment," "an embodiment" or "some embodiments" means that a particular feature, structure or characteristic described in connection with the embodiment is included in at least one embodiment of the present invention. Thus, the appearances of the phrases "in one embodiment," "in an embodiment" or "in some embodiments" in various places throughout this specification are not necessarily all referring to the same embodiment or embodiments, but may be in some instances. Furthermore, the particular features, structures, or characteristics may be combined in any suitable manner in one or more embodiments.

The term "about" when used before a numerical value indicates that the value may vary within reasonable range, such as ±10%, ±5%, and ±1%.

"Alkyl" refers to a straight or branched hydrocarbon chain radical consisting solely of carbon (C) and hydrogen (H) atoms, which is saturated or unsaturated (i.e., contains one or more double and/or triple bonds). In some embodiments, alkyl has from 1 to 30 carbon atoms ($C_1$-$C_{30}$ alkyl), and which is attached to the rest of the molecule by a single bond, e.g., methyl, ethyl, n-propyl, 1-methylethyl (iso-propyl), n-butyl, n-pentyl, 1,1-dimethylethyl (t-butyl), 3-methylhexyl, 2-methylhexyl, ethenyl, prop-1-enyl, but-1-enyl, pent-1-enyl, penta-1,4-dienyl, ethynyl, propynyl, butynyl, pentynyl, hexynyl, and the like. Unless stated otherwise specifically in the specification, an alkyl group may be optionally substituted. In some embodiments, alkyl is a straight or branched hydrocarbon chain radical having 1 to 24 carbon atoms ($C_1$-$C_{24}$ alkyl), 1 to 10 carbon atoms ($C_1$-$C_{10}$ alkyl), 1 to 6 carbon atoms ($C_1$-$C_6$ alkyl), or 1 to 4 carbon atoms ($C_1$-$C_4$ alkyl).

In this disclosure, ECP films having low self-bleaching and/or enhanced cycling stability and electrochromic devices comprising the ECP films are provided. In some embodiments, the ECP films have a percentage change of the optical density (ΔOD/OD (%)) of no more than about 15% or about 10% after 120 seconds under $V_{off}$. In some embodiments, the ECP films have a percentage change of the optical density (ΔOD/OD (%)) of no more than about 20% or about 10% after 900 seconds under $V_{off}$. In some embodiments, the ECP films have a cycling stability of maintaining at least about 95% of color contrast after about 1000 redox cycles or more.

Cathodic Polarization

In some embodiments, provided is a method for suppressing the self-bleaching behavior of an ECP film comprising applying a cathodic polarization.

In some embodiments, provided is a method for preparing an electrochromic device comprising applying a cathodic polarization for at least about 60 seconds.

In some embodiments, the cathodic polarization is applied for at least about 60 seconds, or at least about 120 seconds, or at least about 150 seconds, or at least about 180 seconds, or at least about 210 seconds, or at least about 240 seconds or at least about 270 seconds, or at least about 300 seconds. In some embodiments, the cathodic polarization is applied for about 60 seconds to about 360 seconds. In some embodiments, the cathodic polarization is applied for about 300 seconds. In some embodiments, the polarization potential is from about −0.1 V to about −0.5 V, or from about −0.1 V to about −0.4 V, about −0.1 V to about −0.3 V, or about −0.2 V.

In some embodiments, the ECP film is capable of maintaining a colored state for at least 300 seconds or at least 600 seconds. In some embodiments, the ECP film has a percentage change of the optical density (ΔOD/OD (%)) under $V_{off}$ of no more than about 15% or about 10% after 120 seconds. In some embodiments, the ECP film has a percentage change of the optical density (ΔOD/OD (%)) under $V_{off}$ of no more than about 5% after 120 seconds.

Substrate Modification

In some embodiments, provided is an electrochromic device (ECD) comprising an electrochromic polymer (ECP) film on a modified transparent conductive oxide substrate which is a transparent conductive oxide (TCO) substrate partially or fully covered with a modification material selected from $C_6$-$C_{24}$alkyltrichlorosilane, $TiO_2$, ZnO, $WO_3$, $MoO_3$, $V_2O_5$, NiO, $Ni_2O_3$, and $Ni_3O_4$, HMDS (bis(trimethylsilyl)amine), APTS ((3-aminopropyl)triethoxysilane), and trimethoxy(2-phenylethyl)silane, poly(vinylidene fluoride-co-hexafluoropropylene) (PVDF-HFP), poly(3,4-ethylenedioxythiophene)-poly(styrenesulfonate) (PEDOT:PSS), or a combination thereof. Such surface modification could increasing the adhesion between ECP and the conductive surface.

In some embodiments, the transparent conductive oxide substrate comprises indium tin oxide (ITO), fluorine-doped tin oxide (FTO), aluminium-doped zinc oxide (AZO), or antimony-doped tin oxide (ATO), or a mixture thereof. In some embodiments, the transparent conductive oxide substrate comprises ITO. In some embodiments, the transparent conductive oxide substrate comprises FTO. In some embodiments, the transparent conductive oxide substrate comprises ATO. In some embodiments, the transparent conductive oxide substrate comprises AZO.

In some embodiments, the modification material comprises $TiO_2$. In some embodiments, the modification material comprises ZnO. In some embodiments, the modification material comprises $WO_3$. In some embodiments, the modification material comprises $MoO_3$. In some embodiments, the modification material comprises $V_2O_5$. In some embodiments, the modification material comprises NiO. In some embodiments, the modification material comprises $Ni_2O_3$. In some embodiments, the modification material comprises $Ni_3O_4$. In some embodiments, the modification material comprises HMDS (bis(trimethylsilyl)amine). In some embodiments, the modification material comprises APTS ((3-aminopropyl)triethoxysilane). In some embodiments, the modification material comprises trimethoxy(2-phenylethyl)silane. In some embodiments, the modification material comprises poly(vinylidene fluoride-co-hexafluoropropylene) (PVDF-HFP). In some embodiments, the modification material comprises poly(3,4-ethylenedioxythiophene)-poly(styrenesulfonate) (PEDOT:PSS).

In some embodiments, the modification material comprises $C_6$-$C_{24}$alkyltrichlorosilane. In some embodiments, the modification material comprises $C_{10}$-$C_{20}$alkyltrichlorosilane. In some embodiments, the alkyl is saturated straight or branched hydrocarbon chain. In some embodiments, the alkyl is saturated straight hydrocarbon chain.

In some embodiments, the modification material comprises octadecyltrichlorosilane (OTS).

In some embodiments, the modification material is in the form of a thin layer. In some embodiments, the modification material forms a self-assembled monolayer on the TCO substrate.

In some embodiments, the thickness of a thin layer is less than about 100 nm or less than about 50 nm, or less than about 20 nm, or less than about 10 nm.

In some embodiments, the transparent conductive oxide substrate is fully covered with the modification material. In some embodiments, the transparent conductive oxide substrate is partially covered with the modification material. In some embodiments, about 100%, 99%, 95%, 90%, 85%, 80%, 75%, 70%, 65%, 60%, 55%, 50%, 45%, 40%, 35%, 30%, 25%, 20%, 15%, 10%, or 5%, or any range between any two of the numbers (end points inclusive), of the transparent conductive oxide substrate is covered with the modification material. In some embodiments, the coverage of the modification material on the transparent conductive oxide substrate is between about 10% to about 40%.

In some embodiments, the modified TCO substrate has a higher hydrophobicity than an unmodified TCO substrate.

In some embodiments, the modified TCO substrate has contact angles of at least 100°, or at least 110°, such as about 116°.

In some embodiments, provided is an electrochromic device (ECD) wherein the self-bleaching behavior of an electrochromic polymer (ECP) film is suppressed, the ECD comprising:
   a modified TCO substrate that is partially or fully covered by a modification material; and
   the ECP film on the modified TCO substrate, wherein the modified TCO substrate is obtained by a method comprising immersing the TCO substrate in a solution of a modification material for a period of time.

In some embodiments, provided is an electrochromic device (ECD) wherein the self-bleaching behavior of an electrochromic polymer (ECP) film is suppressed, the ECD comprising:
- a partially octadecyltrichlorosilane (OTS) covered indium tin oxide (ITO) substrate (POTS-ITO substrate); and
- the ECP film on the POTS-ITO substrate, wherein the POTS-ITO substrate is obtained by a method comprising immersing the ITO substrate in an OTS hexane solution for a period of time.

In some embodiments, the period of time is about 60 minutes to about 15 hours, or about 60 minutes to about 2 hours, or about 60 minutes to about 100 minutes. In some embodiments, the period of time is about 80 minutes.

In some embodiments, provided is a method for preparing an electrochromic device comprising forming an electrochromic polymer film on modified TCO substrate partially or fully covered with a modification material.

In some embodiments, provided is a method for preparing an electrochromic device comprising forming an electrochromic polymer film on an indium tin oxide substrate partially covered with octadecyltrichlorosilane.

In some embodiments, provided is a method for suppressing a self-bleaching behavior of an electrochromic polymer (ECP) film, comprising:
- obtaining a partially octadecyltrichlorosilane (OTS) covered indium tin oxide (ITO) substrate (POTS-ITO substrate); and
- forming the ECP film on the POTS-ITO substrate.

In some embodiments, the obtaining the POTS-ITO substrate comprises immersing the ITO substrate in an OTS hexane solution for a period of time, such as from about 60 minutes to about 15 hours, about 60 minutes to about 2 hours, about 60 minutes to about 100 minutes, or about 80 minutes.

In some embodiments, the concentration of the OTS hexane solution is about 0.1 vol % to about 10 vol %. In some embodiments, the concentration of the OTS hexane solution is about 1 vol %.

In some embodiments, the method further comprises cleaning the ITO substrate prior to immersing the ITO substrate in the OTS hexane solution.

In some embodiments, cleaning the ITO substrate comprises
- washing the ITO substrate in one or more ultrasonic baths, such as a ultrasonic bath of ethanol, acetone, and/or ethanol;
- drying the ITO substrate; and
- treating a conducting side of the ITO substrate in a UV-ozone chamber.

In some embodiments, cleaning the ITO substrate comprises
- washing the ITO substrate in ultrasonic bath of ethanol, acetone, ethanol for about 10 minutes each;
- drying the ITO substrate by nitrogen blowing; and
- treating a conducting side of the ITO substrate in a UV-ozone chamber for about 20 minutes.

In some embodiments, the method further comprises applying a cathodic polarization as described herein.

In some embodiments, the OTS coverage on the ITO substrate is between about 10% to about 40%.

In some embodiments, the OTS forms a self-assembled monolayer on the ITO substrate.

In some embodiments, the thickness of the OTS layer is about 2 nm to about 4 nm.

In some embodiments, the POTS-ITO substrate has a higher hydrophobicity than the ITO substrate.

In some embodiments, the ITO substrate has contact angles of at least 100°, or at least 110°, such as about 116°.

In some embodiments, the ECP film on a modified transparent conductive oxide substrate, such as a POTS-ITO substrate, has a cycling stability that is higher than that of the ECP film on an unmodified transparent conductive oxide substrate, such as an unmodified ITO substrate.

In some embodiments, the ECP film is further treated with a cathodic polarization for about 60 seconds to about 360 seconds, such as at least about 60 seconds, or at least about 120 seconds, or at least about 150 seconds, or at least about 180 seconds, or at least about 210 seconds, or at least about 240 seconds, or at least about 270 seconds, or at least about 300 seconds. In some embodiments, the ECP film is further treated with a cathodic polarization for about 300 seconds. In some embodiments, the polarization potential is from about −0.1 V to about −0.5 V, or from about −0.1 V to about −0.4 V, about −0.1 V to about −0.3 V, or about −0.2 V.

In some embodiments, the ECP film on a modified transparent conductive oxide substrate, such as a POTS-ITO substrate, with cathodic polarization is capable of maintaining a colored state for at least about 600 seconds or at least about 900 seconds. In some embodiments, the ECP film has a percentage change of the optical density ($\Delta OD/OD$ (%)) under $V_{off}$ of no more than about 20% or about 10% after 900 seconds. In some embodiments, the ECP film has a percentage change of the optical density ($\Delta OD/OD$ (%)) under $V_{off}$ of no more than about 8% after 900 seconds.

In some embodiments, the modified transparent conductive oxide substrate, such as a POTS-ITO substrate, shows a lower peak current density than an unmodified transparent conductive oxide substrate, such as an unmodified ITO substrate, in a cyclic voltammetry measurement. In some embodiments, the modified transparent conductive oxide substrate, such as a POTS-ITO substrate, has a peak current density of less than about 0.04 mA/cm$^2$. In some embodiments, the modified transparent conductive oxide substrate, such as a POTS-ITO substrate, has a peak current density of about 0.03 mA/cm$^2$. In some embodiments, the modified transparent conductive oxide substrate, such as a POTS-ITO substrate, shows a larger distance between cathodic and anodic peaks than an unmodified transparent conductive oxide substrate, such as an unmodified ITO substrate, in a cyclic voltammetry measurement. In some embodiments, the modified transparent conductive oxide substrate, such as a POTS-ITO substrate, has a distance between cathodic and anodic peaks of at least about 0.5 V. In some embodiments, the modified transparent conductive oxide substrate, such as a POTS-ITO substrate, has a distance between cathodic and anodic peaks of about 0.6 V.

In some embodiments, the ECP film has a cycling stability of maintaining at least 95% of color contrast after about 1000 redox cycles or about 2000 redox cycles or more.

In some embodiments, the OTS forms a self-assembled monolayer on the ITO substrate, and the coverage of the OTS on the ITO substrate is between about 10% to about 40%.

In some embodiments, the POTS-ITO substrate has a higher hydrophobicity than the ITO substrate.

Electrochromic Polymers

In some embodiments, the ECP film comprises an ECP selected from poly-3,4-ethylenedioxy thiophene (PEDOT), poly-2,2'-bithiophene, polypyrrole, polyaniline (PANI), polythiopene, polyisothianaphthene, poly(oaminophenol), polypyridine, polyindole, polycarbazole, polyquinone, octacyanophthalocyanine, viologen, anthraquinone, phenocyazine, and combinations thereof.

In some embodiments, the ECP film comprises an ECP selected from wherein R is $C_1$-$C_{30}$ alkyl, each of x, y and n is independently an integer greater than 0.

In some embodiments, R is 2-ethylhexyl. In some embodiments, each of x and y is independently an integer from 1 to 50, from 1 to 25 or from 1 to 12. In some embodiments, n is an integer from 1 to 200, from 1 to 100 or from 1 to 50.

In some embodiments, the ECP film is selected from a group consisting of an ECP-Black film, an ECP-Magenta film, and an ECP-Blue film.

In some embodiments, the thickness of the ECP film is about 200 nm to about 500 nm, or about 250 to about 450 nm, or about 300 nm to about 400 nm, or about 375 nm.

In some embodiments, provided is an electrochromic device (ECD) comprising an electrochromic polymer (ECP) film described herein.

In some embodiments, the ECD is a smart window or a display system.

Examples

In this disclosure, we present our studies on the electrochemical processes of ECP-Black thin films in association with self-bleaching behaviors. First, the impact of an electrochemical break-in process was probed. Then, the effect of cathodic polarization time on the self-bleaching behaviors of conjugated polymers was investigated. Finally, we propose a method for impeding a spontaneous charge transfer at interfaces by modifying the substrate surface. Combing a long cathodic polarization (300 seconds (s)) and a modified surface, our method can suppress the self-bleaching of the ECP-Black thin films. This approach is general and applicable to ECP-Magenta, and ECP-Blue thin films as well. In addition, a cycling stability of the ECP-Black thin film on an ITO can also be improved upon the surface modification.

Figure 1A:
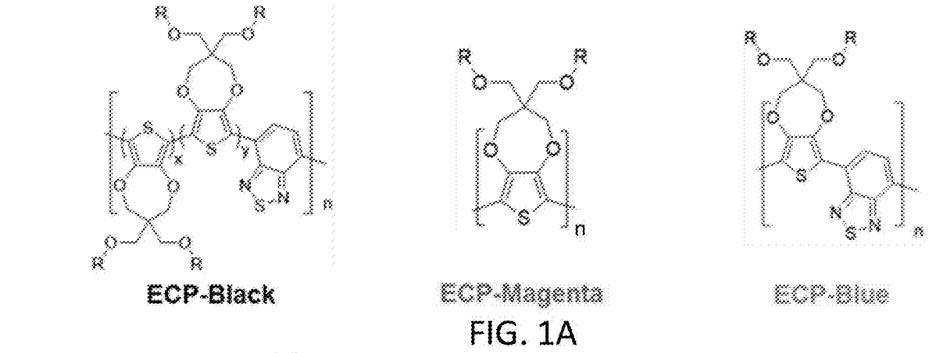
FIG. 1A is graphical representation illustrating chemical structures of an ECP-Black, an ECP-Magenta, and an ECP-Blue thin film.
Figure 1B:
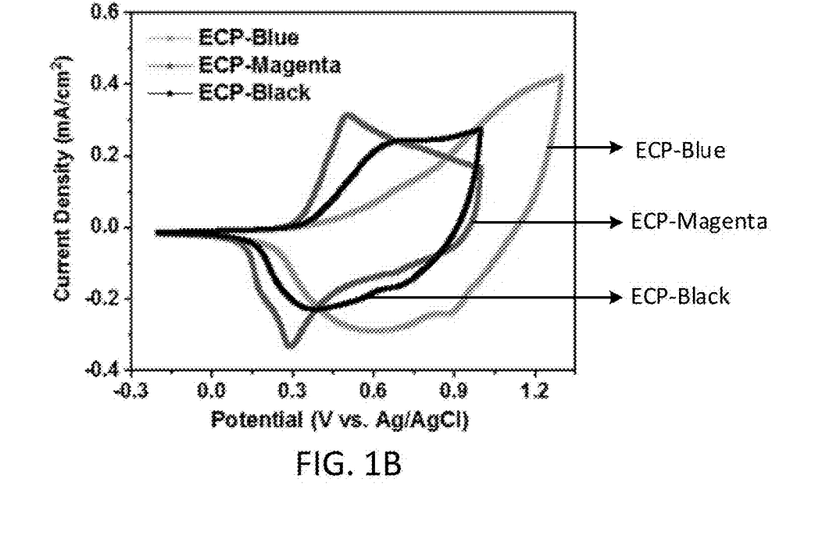
FIG. 1B is a diagram illustrating cyclic voltammetry measurement results of the ECP-Black, ECP-Magenta, and ECP-Blue thin films, consistent with exemplary embodiments of the present disclosure.

FIG. 1A is a graphical representation illustrating chemical structures of an ECP-Black, an ECP-Magenta, and an ECP-Blue thin film, where R is 2-ethylhexyl. FIG. 1B is a diagram of cyclic voltammetry (CV) measurement results of the ECP-Black, ECP-Magenta, and ECP-Blue thin films. As shown in FIG. 1B, in some embodiments, a HOMO energy level of the ECP-Black was estimated to be −4.8 eV by using an empirical formula (Eqn. (1)). Thus, the self-bleaching of the ECP-Black polymer could occur under $V_{off}$ due to an interface electron transfer (IET) according to a previous work (Shin, H.; Seo, S.; Park, C.; Na, J.; Han, M.; Kim, E. Energy Saving Electrochromic Windows from Bistable Low-HOMO Level, Conjugated Polymers. *Energy Environ. Sci.* 2016, 9 (1), 117-122).

$$E_{HOMO} = -[4.8 + (E_{ox} - E_{1/2(ferrocene)})] \text{eV} \quad (1)$$

where $E_{HOMO}$ is the HOMO energy level of the conjugated polymer; $E_{ox}$ is an onset oxidation potential of the conjugated polymer obtained from the CV measurement result of the ECP-Black thin film, which is comparable to an $E_{ox}$ measured in a differential pulse voltammetry (DPV) measurement; the $E_{1/2(ferrocene)}$ is the half-wave potential of ferrocene.

Figure 2A:
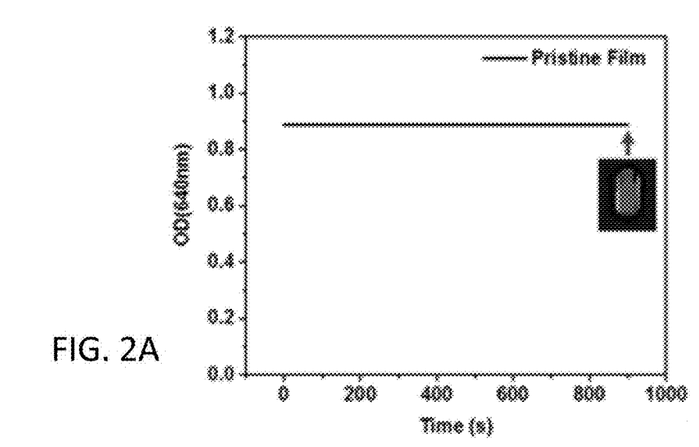
FIGS. 2A-B are diagrams illustrating in-situ optical density measurement results of the ECP thin film: (A) at a pristine state and (B) after a break-in process and at different potentials.

FIG. 2A shows a diagram illustrating an in-situ optical density (OD) measurement result of the ECP thin film at a pristine state; consistent with exemplary embodiments of the present disclosure. An inset in FIG. 2A shows a photograph of an exemplary pristine film. In some embodiments, an optical memory of the pristine ECP-Black thin film was evaluated with recording the absorption change at ~$\lambda_{max}$ (640 nm) for 900 s under $V_{off}$. As shown in FIG. 2A, the absorption of the pristine film remained unchanged, suggesting that the pristine thin-film did not undergo self-bleaching within the observation period. This observation does not follow the early report that conjugated polymers with HOMO levels higher than −5.0 eV will undergo self-bleaching on the ITO substrate.

Figure 2B:
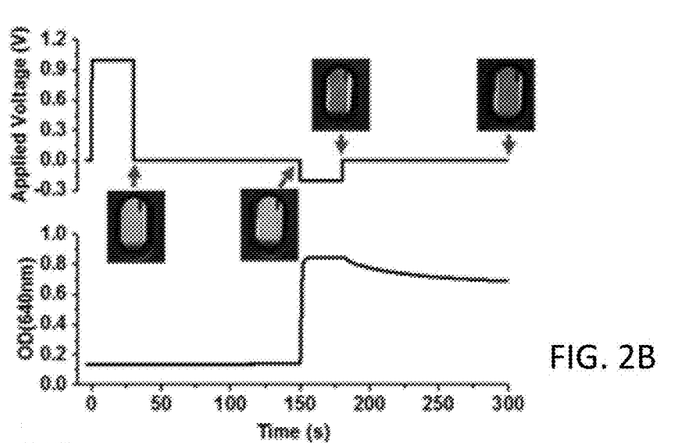

Next, in some embodiments, 15 cycles of break-in processes was applied to the ECP-Black thin film by cycling from −0.2 V to 1.0 V at 40 mV/s. After that, the ECP-Black thin film was first oxidized to its bleached state. The pre-oxidized thin film was then subjected to 1 V for 30 s and the potential was switched off from the $30^{th}$ to $150^{th}$ second. The absorption profile of the bleached ECP-Black thin film had little change, indicating that a self-coloring is absent. Subsequently, the ECP-Black thin film was reduced back to its colored (neutral) state by applying a reverse bias at −0.2 V for 30 s. When the cathodic voltage bias was removed, the OD of the colored thin film immediately started to decay, as shown in FIG. 2B. Insets in FIG. 2B show photographs of the exemplary ECP-Black film at different states. The ECP-Black thin film can be reversely switched from transmissive state to its original black-blue color state, suggesting that the polymer thin film does not decompose during the break-in process and the cycling test. Therefore, we propose that an activation of the self-bleaching behavior can be ascribed to a change of a structure of the ECP-Black thin film during oxidation-reduction (redox) processes.

In some embodiments, atomic-force microscopy (AFM) and electrochemical impedance spectroscopy (EIS) experiments may be conducted to probe the structural changes of the ECP-Black thin film after the break-in process. For example, in measured AFM images, looser topologies can be observed for ECP-black thin films after the break-in process. As a result, the loose morphologies can facilitate diffusions of solvated ions to compensate the positive charges generated on the polymer backbone during the self-bleaching process. Dramatical structural changes for the pristine film may also be observed in a volume change of polypyrrole (dodecylbenzenesulfonate) (PPy(DBS)) during redox cycles by using in-situ AFM experiments (Smela, E.; Gadegaard, N. Surprising Volume Change in PPy(DBS): An Atomic Force Microscopy Study, Adv. Mater. 1999, 11 (11), 953-957). In some embodiments, the volume changes of the first cycle may be between 60-100%, whereas only a 30-40% of volume change may be obtained in the following cycles. The differences of volume change indicate that the pristine compactness of the PPy(DBS) thin films cannot be recovered. Wang et al. also observed the slow ion diffusion in the first reduction of PPy (DBS) could be due to exceptionally compact of the as-deposited film (Wang, X.; Shapiro, B.; Smela, E. Visualizing Ion Currents in Conjugated Polymers, Adv. Mater. 2004, 16 (18), 1605-1609). Our results are in good agreement with the previous studies that initial electrochemical processes can cause the structural change of the pristine conjugated polymer thin films.

Figure 2C:
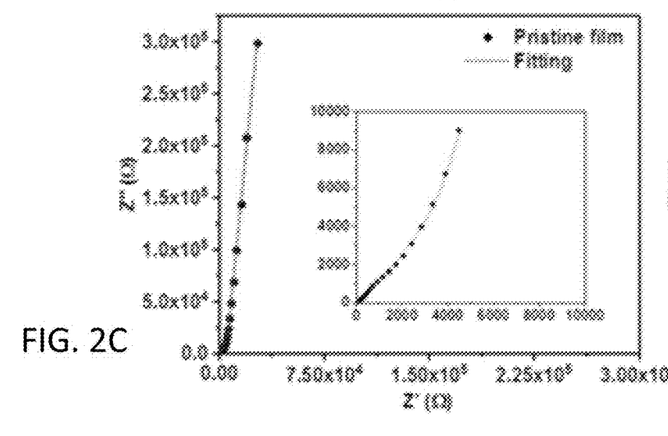
FIGS. 2C-D are diagrams illustrating EIS measurement results of the ECP-Black thin film: (C) at a pristine state and (D) after a break-in process and with 300 s of a cathodic polarization, consistent with exemplary embodiments of the present disclosure.
Figure 2D:
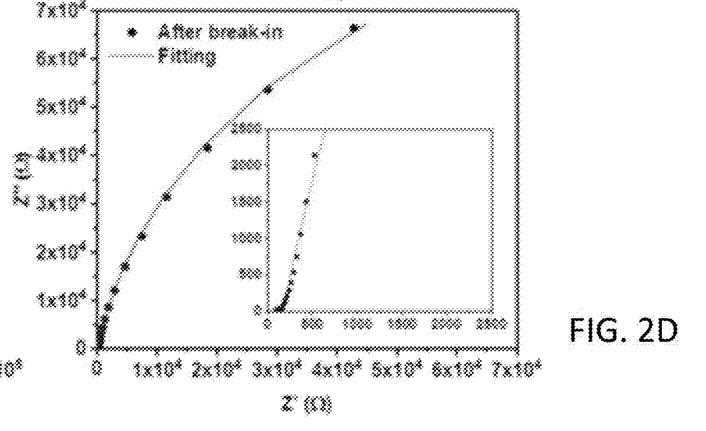

The structural change of the ECP-Black caused by the break-in process was further confirmed by EIS measurements. FIGS. 2C-D are diagrams illustrating the EIS measurement results of the ECP-Black thin film: (C) at a pristine state and (D) after a break-in process and with 300 s of a cathodic polarization, consistent with exemplary embodiments of the present disclosure. In some embodiments, the EIS of the ECP-Black film before the break-in process was first measured, and the EIS was measured with a frequency from 1 Hz to 1 MHz. Then, the break-in process was carried out, followed by a 300 s cathodic polarization potential (−0.2 V) that was applied to reset the ECP-Black thin film back to its color state. Right after the cathodic polarization, the EIS of the broken-in thin film (i.e., the thin film experienced with a break-in process) was taken, as shown FIG. 2D.

In the EIS experiment, because an electrode was coated with a neutral semiconducting polymer thin film, the counter-ions need to penetrate through the polymer thin film to reach the interfaces where the charge transfer occurred. The EIS results can hence be fitted by the equation $R_s(Q_{film}R_{film})$ $(Q_{dl}R_{ct})$, where $R_s$ is a solution resistance; $Q_{film}$ and $R_{film}$ are capacitance and resistance of the thin film; $Q_{dl}$ and $R_{ct}$ are double layer capacitance and charge transfer resistance at the ECP-Black film/ITO interfaces. The fitted results are summarized in the following Table 1. Both $R_{film}$ and $R_{ct}$ decreased dramatically for the broken-in thin film, even after applying a 300 s cathodic pre-polarization to reset the film. This may imply that the ECP-Black thin film became looser, which could be easier for the counter-ions to permeate through and facilitate the self-bleaching process (as indicated in Eqn 1).

TABLE 1

|  | Pristine Film | Thin film (after break-in + 300s polarization) |
|---|---|---|
| $R_s/\Omega$ | 52.72 | 59.93 |
| $Q_{film}/F \cdot s^{(a-1)}$ | $0.5713 \times 10^{-6}$ | $2.04 \times 10^{-6}$ |
| $a_{film}$ | 0.959 | 0.8896 |
| $R_{film}/\Omega$ | $45.97 \times 10^6$ | $1.97 \times 10^5$ |
| $Q_{dl}/F \cdot s^{(a-1)}$ | $4.313 \times 10^{-6}$ | $2.461 \times 10^{-6}$ |
| $a_{dl}$ | 0.5649 | 0.6049 |
| $R_{ct}/\Omega$ | 6693 | 111.4 |

Figure 3A:
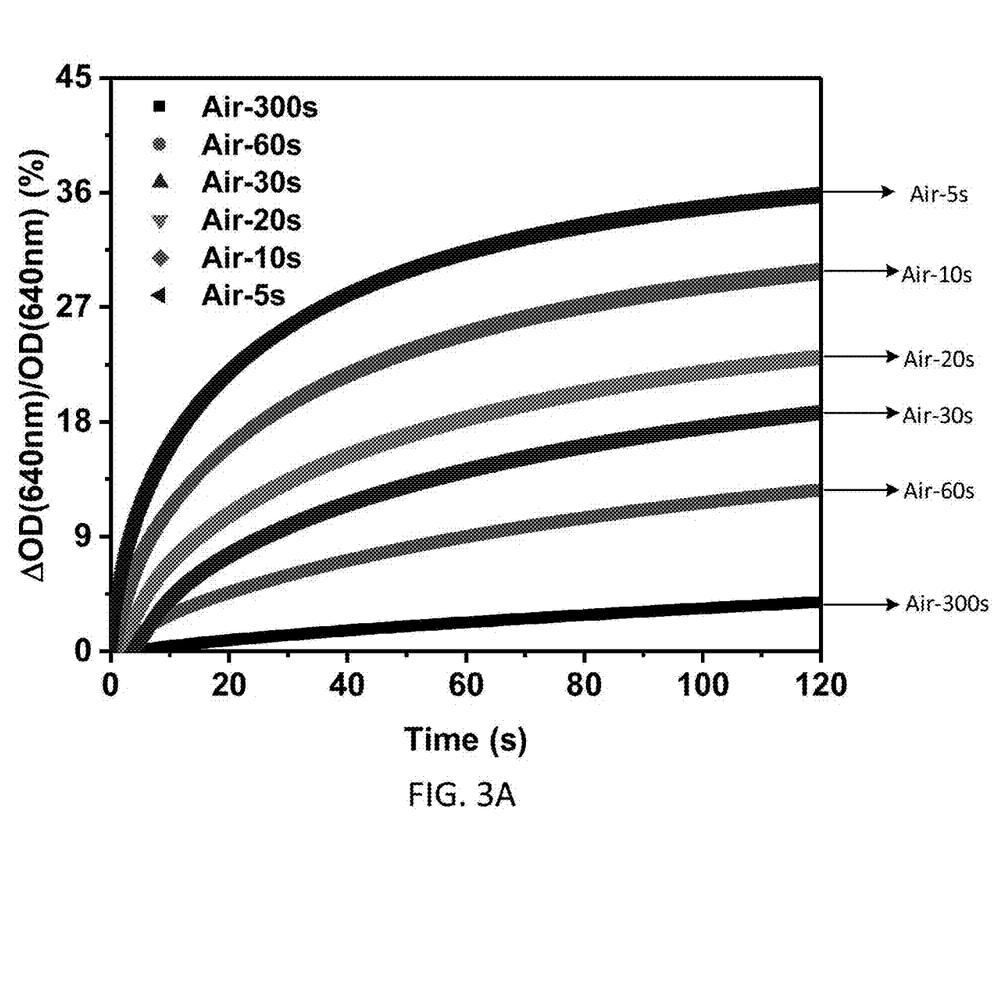
FIG. 3A is a diagram illustrating an exemplary short-term percentage change of optical density after applied different periods of reverse bias (−0.2 V) in an ambient environment.

A relationship between the cathodic polarization and a degree of the self-bleaching of the ECP-Black thin film has also been explored. The degree of self-bleaching was quantified as the percentage change of the optical density ($\Delta OD/OD$ (%)) under $V_{off}$. FIG. 3A shows an exemplary short-term percentage change of the optical density after applied different periods of reverse bias (−0.2 V) in an ambient environment, consistent with exemplary embodiments of the present disclosure. The degree of self-bleaching within 120 s may decrease with an increase of the cathodic polarization time. The result matches the ESCR model. The longer the cathodic polarization, the more counter-ions/electrolyte can be expelled out from the polymer matrix, and the polymer matrix may become more condensed due to the electroosmotic processes. A electroosmotic process refers to a motion of ions induced by an applied potential across a porous material. Once the voltage is turned off, the degree of self-bleaching becomes lower, since it becomes more difficult for ions to penetrate into the thin film to compensate the positive charge generated in the self-bleaching process. These results may suggest that the permeation of the compensated ions is necessary for the self-bleaching processes and can be potentially taken advantage to mediate the degree of the self-bleaching. Also, it is consistent with the previous observation (FIGS. 2A-B) that the self-bleaching behaviors may only occur when the ECP-Black thin film presents a loose structure resulted from the break-in process.

Figure 3B:
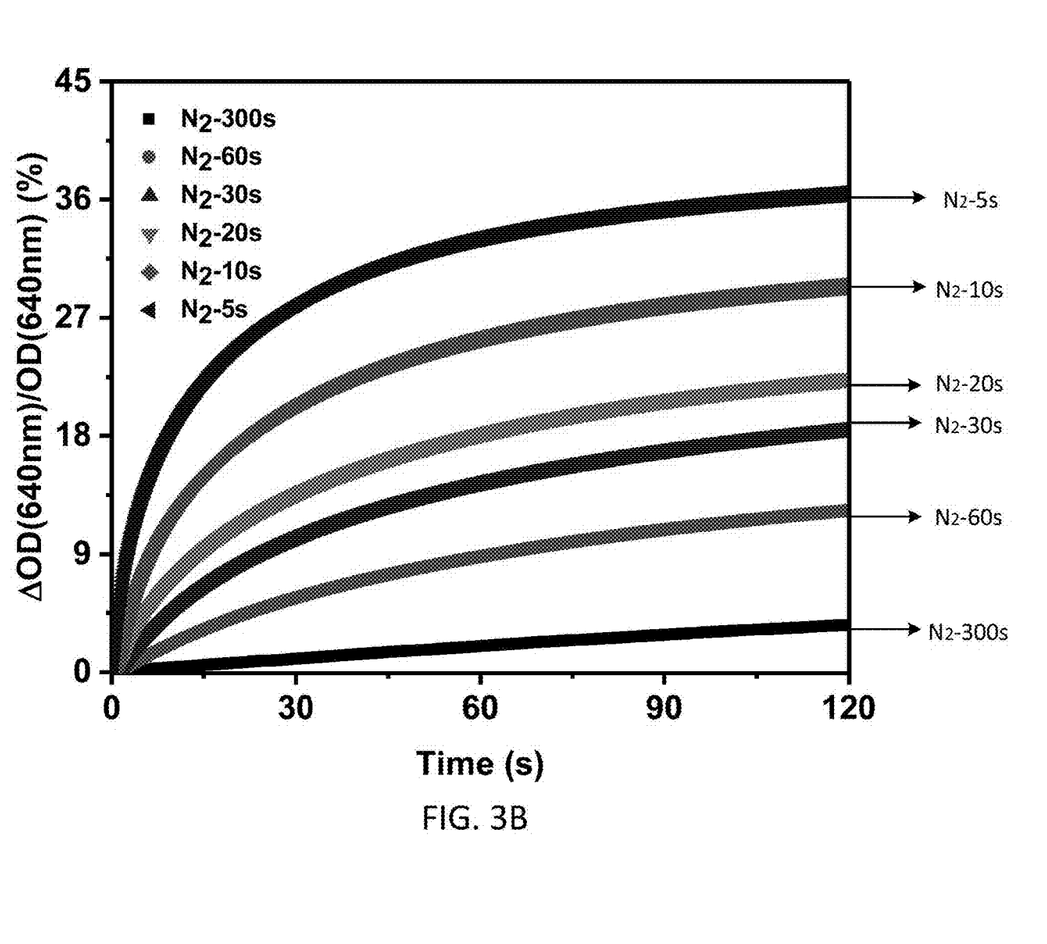
FIG. 3B is a diagram illustrating an exemplary short-term percentage change of optical density after applied different periods of reverse bias (−0.2 V) under nitrogen flow with a 10 L/min flow rate, consistent with exemplary embodiments of the present disclosure.

A more rigorous procedure was adopted to rule out the effect of oxidant (e.g. molecular oxygen in the air) that might cause the self-bleaching of ECP-Black. FIG. 3B shows an exemplary short-term percentage change of the optical density after applied different periods of reverse bias (−0.2 V) under nitrogen flow with a 10 L/min flow rate, consistent with exemplary embodiments of the present disclosure. In some embodiments, a freeze pump treatment was applied to get rid of oxygen residues inside the electrolyte. A cuvette was sealed by a Teflon tape and parafilm inside the $N_2$ glove box. The spectral measurement was conducted under the $N_2$ protection. Results in FIG. 3B suggest that the cathodic polarization may still play a role in controlling the degree of self-bleaching, which is similar to the results obtained under the ambient conditions. The degree of self-bleaching decreases when increasing the period of cathodic polarization. In addition, if the existing of the oxidant were the dominant factor that caused the self-bleaching of the black-ECP thin film, then the self-bleaching would be observed for the pristine film before any electrochemical experiments (which cannot be observed in FIG. 2A). Thus, the self-bleaching of the break-in ECP-Black thin films may be due to the spontaneous electron transfer from the ECP-Black thin film to the ITO electrode, instead of the effect of an oxidant.

To mitigate the self-bleaching problem, interfacial engineering has been proposed to evade a need for redesigning the polymer structure. Octadecyltrichlorosilane (OTS) modification has been widely used in the field of organic field effect transistor (OFET) to increase the adhesion of the organic layer (e.g. pentacene) to the substrate (Si wafer/ITO). For electrochromic devices, the insulated nature of the OTS could be used to impede the spontaneous electron transfer associated with the self-bleaching of ECP thin film. However, the electrochemical processes of ECP thin films could be hampered at the same time.

Therefore, we propose a method for suppressing the self-bleaching behavior of an ECP thin film by making an ITO partially covered by an OTS (POTS). To generate a partially coverage of the OTS on the ITO, in some embodiments, both roughness of the ITO and an immersion time of the ITO in the OTS solution are critical. For a rough unpolished ITO, it may take longer time (~15 hrs) to form a condensed self-assembled monolayer (SAM) layer. Kept under a 1 vol % OTS hexane solution for a short time (for example, 80 mins), ITO substrates may be partially modified by the OTS.

In one embodiment, to make a POTS covered ITO, ITO substrates was first washed by ultrasonic bath of ethanol, acetone, ethanol for about 10 mins each. Then the washed ITO substrates was dried by nitrogen blowing. Next, conducting sides of the ITO substrates was treated for about 20 mins in a UV-ozone chamber. Then the ITO was partially covered by the OTS monolayer (POTS) after immersing in a 1 vol % OTS hexane solution for about 80 mins.

Figure 4A:
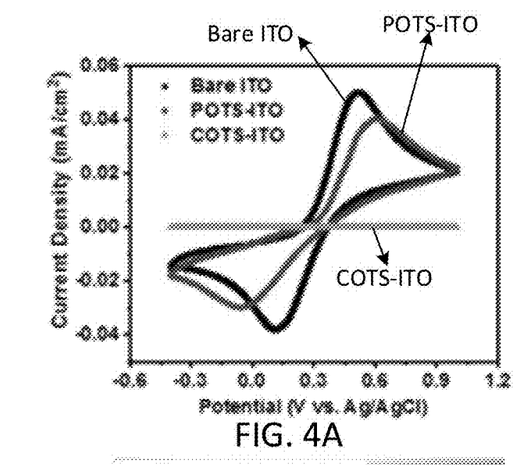
FIG. 4A is a diagram illustrating cyclic voltammetry measurement results of 0.1 M Ferrocene in 0.1 M TBAPF$_6$ PC using a POTS-ITO, COTS-ITO, and ITO as working electrodes.

To evaluate the coverage of the as-formed SAM layer, cyclic voltammetry experiments of 0.1 M ferrocene in propylene carbonate with 0.1 M tetrabutylammonium hexafluorophosphate (TBAPF$_6$) was conducted by using a bare ITO and an OTS modified ITO, respectively. In some embodiments, potential was scanned from −0.4 V to 1.0 V vs. Ag/AgCl at 40 mV/s. FIG. 4A is a diagram illustrating cyclic voltammetry results of 0.1M Ferrocene in 0.1 M TBAPF$_6$ propylene carbonate (PC) using a POTS-ITO, a condensed OTS (COTS)-ITO, and an ITO as working electrodes, consistent with exemplary embodiments of the present disclosure. For the OTS modified ITO, the voltammogram of ferrocene shows a lower peak current density, and a larger distance between cathodic and anodic peaks, as compared to the bare ITO. By extending the absorption time to 15 hours, a more condensed OTS layer can be formed on an ITO, which is indicated by the extremely small current from the CV of ferrocene, as shown in FIG. 4A. The distinct difference between the CV signals of ferrocene may demonstrate that the ITO is partially covered by the OTS at which electron transfer is interfered, but could proceed with the aid of an external potential. The coverage of the OTS on the ITO may be between 10% to 40%, estimated from the anodic peak current of cyclic voltammetry results.

Figure 4B:
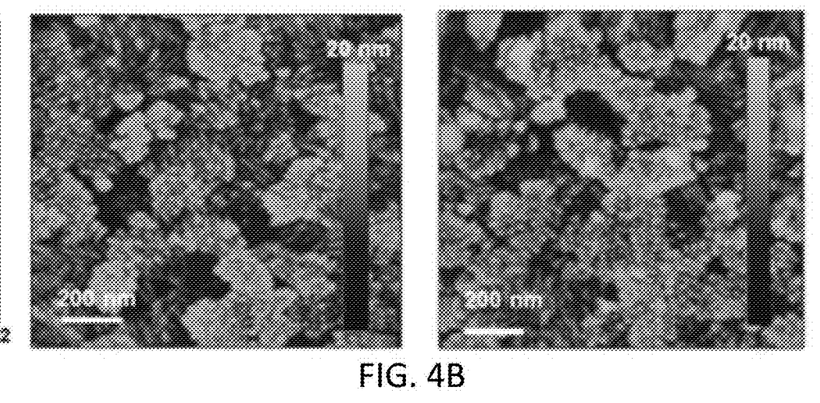
FIG. 4B is a graphical representation illustrating exemplary AFM images of the ITO and POTS-ITO.
Figure 4C:
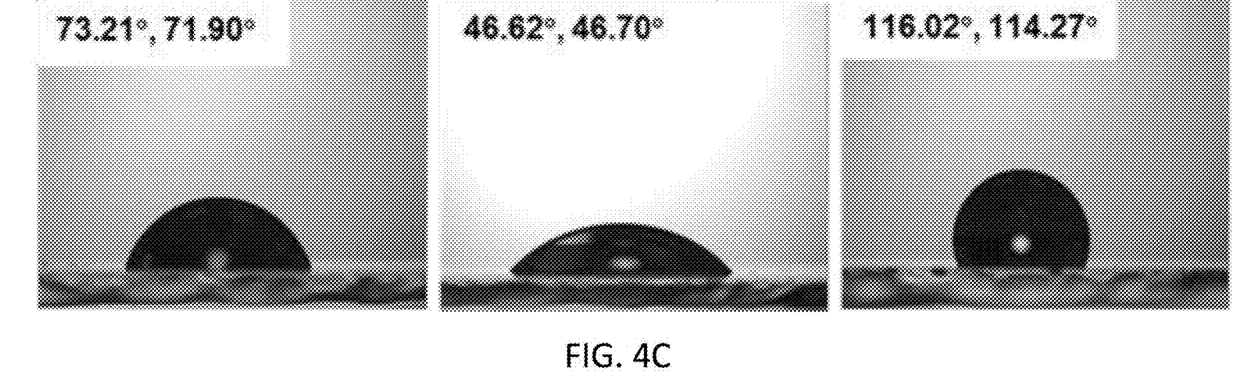
FIG. 4C is exemplary contact angle images of bare ITO, UV-ozone treated ITO and POTS-ITO thin films, consistent with exemplary embodiments of the present disclosure.

To further evaluate the formation of POTS layer on the ITO, contact angle and AFM measurements was performed. FIG. 4B is a graphical representation illustrating exemplary AFM images of the ITO and POTS-ITO; and FIG. 4C is exemplary contact angle images of a bare ITO, a UV-ozone treated ITO and a POTS-ITO, consistent with exemplary embodiments of the present disclosure.

In the contact angle measurements, in some embodiments, 5 µL of deionized water was first titrated on the top of each substrate, and images then was taken immediately. The substrate was cleaned by a UV-ozone before the OTS modification. The surface wettability of the bare ITO, UV-ozone cleaned ITO, and partially OTS modified ITO (POTS-ITO) can be determined by their contact angles, respectively. In some embodiments, the average contact angle values may be obtained from measurements at four different positions (shown in Table 2).

TABLE 2

| Bare ITO | | UV-Ozone-ITO | | POTS-ITO | |
|---|---|---|---|---|---|
| 79.87 ± 5.91 | 80.02 ± 6.30 | 49.12 ± 2.43 | 49.04 ± 3.27 | 115.95 ± 2.09 | 115.46 ± 1.63 |

As shown in FIG. 4C and Table 2, after the UV-ozone treatment, the ITO surface may become more hydrophilic with a small contact angle. The hydrophobicity of the ITO surface increases after the OTS modification, suggested by a larger value of the contact angle ~116°. The increase of the contact angle compared to that of the UV-zone treated ITO (~49°) suggests the formation of OTS layer on the ITO surface. From the exemplary AFM measurement results shown in FIG. 4B, the average $R_q$ increases slightly from 2.93 to 3.38 nm which may suggest a SAM layer has been formed on most of the surfaces.

To test the effect of the POTS layer on the self-bleaching behavior of the broken-in ECP-Black thin films, the degree of self-bleaching was measured for ECP-Black thin films on both ITO and POTS-ITO. From curves of the first derivative of the OD (640 nm) as a function of time, the change of the OD (640 nm) was negligible after ~500 s, which is indicated by a small value of the decay rate (dOD/dt). Thus, in some embodiments, 900 s is sufficient and can be selected as a time period for monitoring the degree of a self-bleaching behavior.

Figure 5A:
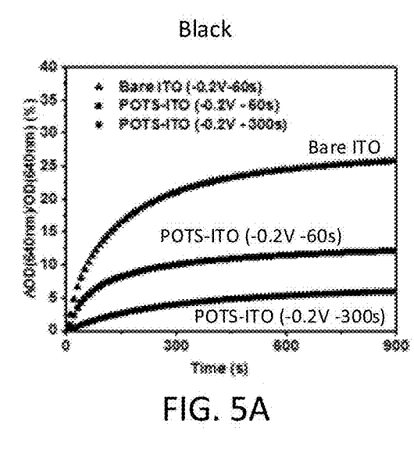
FIGS. 5A-C are diagrams illustrating long-term percentage changes of optical density of exemplary ECP-Black, ECP-Magenta, and ECP-Blue thin films, consistent with exemplary embodiments of the present disclosure.
Figure 5B:
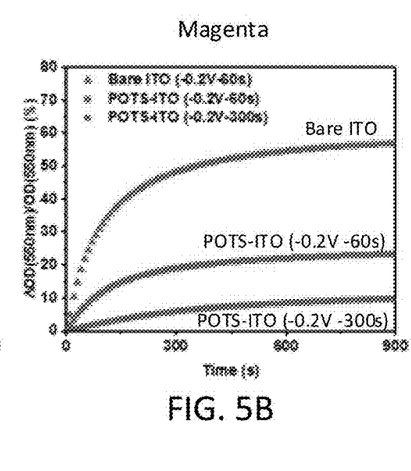
Figure 5C:
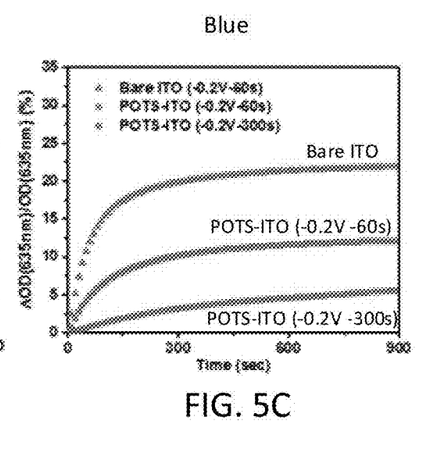

FIGS. 5A-C are diagrams illustrating long-term percentage changes of the OD of an ECP-Black, an ECP-Magenta, and an ECP-Blue thin film, consistent with exemplary embodiments of the present disclosure. FIG. 5A shows a long-term percentage change of the OD of an ECP-Black thin film on a bare ITO after a 60 s cathodic polarization, and on a POTS-ITO after 60 s and 300 s cathodic polarization. In some embodiments, the degree of self-bleaching was observed to decrease from 27.6%±4.6% to 15.5±2.98% after using the POTS-ITO and 60 s cathodic polarization. Here, the average and standard deviation are calculated based on three individual experiments. This decrease in self-bleaching is because that the spontaneous electron transfer is disturbed by the insulated POTS layer. By using 300 s of cathodic polarization, the degree of self-bleaching was further reduced to 7.6%±1.4%. This phenomenon may also support that the self-bleaching behaviors of the ECP-Black thin film are primarily caused by the IET at the organic/ITO interfaces.

To demonstrate a universality of the POTS layer and cathodic polarization on the suppression of the self-bleaching behaviors, in some embodiments, an ECP-Magenta, and an ECP-Blue thin film was selected to measure the optical memory after break-in on both bare ITO and POTS-ITO, and exemplary measurement results are presented in FIGS. 5B and C respectively. Both the ECP-Magenta and ECP-Blue polymer films showed self-bleaching behaviors, because of their high HOMO levels which are calculated to be −4.79 eV and −4.95 eV, respectively (shown in FIG. 1). By using the POTS-ITO and a long cathodic polarization, the degree of the self-bleaching was reduced from 56.78% to 9.75% for the broken-in ECP-Magenta thin film, and from 21.92% to 5.56% for the broken-in ECP-Blue thin film. Therefore, the POTS modification and cathodic polarization may be able to suppress the self-bleaching behaviors of ECP.

Figure 6A:
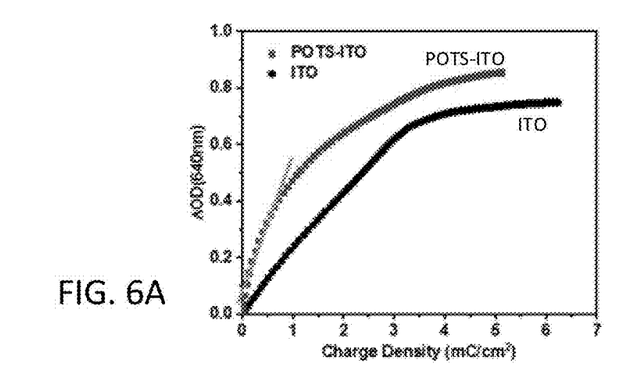
FIG. 6A is a diagram illustrating a coloration efficiency of exemplary ECP-Black thin films on a bare ITO and a POTS-ITO.

In some embodiments, spectroelectrochemical behaviors and electrochromic switching of the ECP-Black thin film on the POTS-ITO was also studied. Comparing the ECP-Black thin film on a bare ITO and a POTS-ITO, in some embodiments, no obvious difference was identified. Since the ITO surface is partially covered by the OTS, electrochemical oxidation/reduction can still progress when driven by an external potential. From an energy point of view, coloration efficiency (CE) measurements can be carried out for the broken-in thin films of the ECP-Black on both substrates. Coloration efficiency can be defined as a change in optical density per unit of inserted charge. FIG. 6A is a diagram illustrating a coloration efficiency of exemplary ECP-Black thin films on a bare ITO and a POTS-ITO, consistent with exemplary embodiments of the present disclosure. The CE of the bleached processes can be calculated from a slope of a curve plotted by ΔOD vs. ejected charge density. Compared to the slope obtained from the ECP-Black on the bare ITO, the CE of the ECP-Black on the POTS-ITO is more inclined at the beginning, but starts to gradually decrease till the end, as shown in FIG. 6A. The initial larger values of the CE may be due to a better contact between the polymer thin film and the ITO electrode, so the electron transfer driven by externally applied voltage is more efficient at the beginning. However, due to the existing of insulated features of POTS modified surfaces, it may require more energy to completely oxidize the whole ECP-Black thin film.

In some embodiments, a cycling stability of the ECP-Black on the POTS-ITO was tested by cyclic voltammetry (CV) and double potential step chronoamperometric (DPSC). The CV cycling test can access the adhesion of the ECP-Black thin film on the substrate by monitoring the development of the voltammogram and peak current density of each cycle. On the other hand, DPSC cycling experiments can provide in-situ transmittance change at an on-off switching mode. However, the transmittance measurement is based on one spot where the light penetrates through, so the result may not represent the conditions of the entire film. Therefore, we can combine these two methods to evaluate the effect of POTS in term of the cycling stability.

Figure 6B:
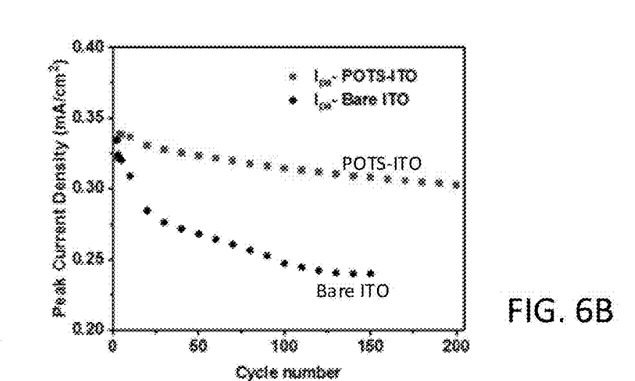
FIG. 6B is a diagram illustrating anodically peak currents of the exemplary ECP-Black thin films on a POTS-ITO and a bare ITO versus number of cycles.
Figure 6C:
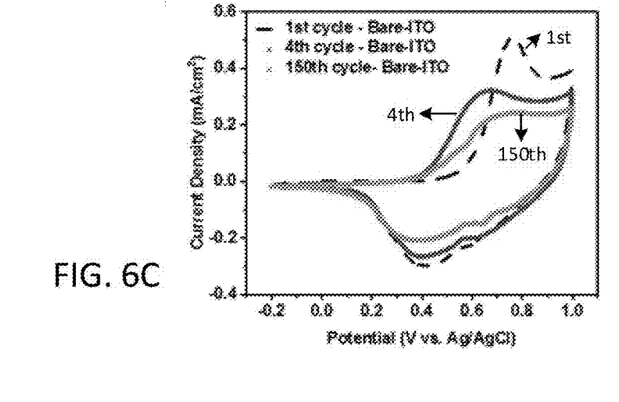
FIGS. 6C-D are diagrams illustrating selected cycling voltammetry of exemplary ECP-Black thin films on a bare ITO and a POTS-ITO, consistent with exemplary embodiments of the present disclosure.
Figure 6D:
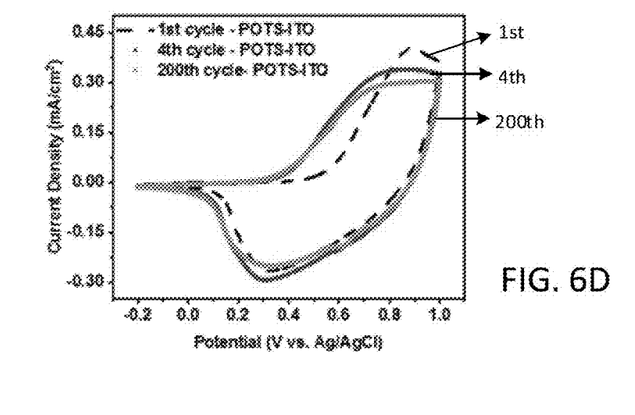

FIG. 6B is a diagram illustrating anodically peak currents of the exemplary ECP-Black thin films on a POTS-ITO and a bare ITO versus number of cycles; and FIGS. 6C-D are diagrams illustrating selected cycling voltammetry of exemplary ECP-Black thin films on a bare ITO and a POTS-ITO, consistent with exemplary embodiments of the present disclosure. In some embodiments, the CV cycling experiments were scanned between −0.2 V to 1.0 V at a scan rate of 40 mV/s. The development of the anodic peak current density ($I_{pa}$) of CV is summarized in FIG. 6B. The voltammogram of the initial cycle, $4^{th}$ cycle, and the last cycle were shown in FIGS. 6C and 6D for the ECP-Black on the POTS-ITO and the bare ITO, respectively. The $I_{pa}$ of the first scan (dash line) was excluded due to a first scan effect as shown in FIGS. 6C and 6D. For the ECP-Black on the bare ITO, the $I_{pa}$ of the CV decreased rapidly, and shapes of the CV changed dramatically with more and more cycles, indicating a delamination of the ECP-Black from the bare ITO. During the redox cycles, the electrochromic thin films on the ITO may be expanded/contracted due to incorporations and extractions of solvated ions. The hydrophilic surface of the ITO may not provide enough adhesion to hydrophobic conjugated polymer thin films to overcome the volume change. It may lead to the delamination of the thin film, indicated by a 28% decrease (from $2^{nd}$ cycle to $150^{th}$ cycle) of the value of $I_{pa}$. For the CV of the ECP-Black on the POTS-ITO, the position of anodic peak slightly moved towards higher potential while the oxidation onset was comparable, indicating that electron transfer is partially impeded. The $I_{pa}$ for the ECP-Black on the POTS-ITO increased slightly from the $1^{st}$ to $4^{th}$ cycle as the thin film became looser for solvated ions to permeate into, and more materials could get involved in the reaction. Then, the $I_{pa}$ decreased 10% from $4^{th}$ cycle to $200^{th}$ cycle (shown in FIG. 6B). The overall shape of CV only changed slightly for the 200 cycles, indicating that the ECP-Black on the POTS-ITO can maintain its adhesion via the hydrophobic interaction (FIG. 6D), thus the cycling stability is improved.

Figure 7A:
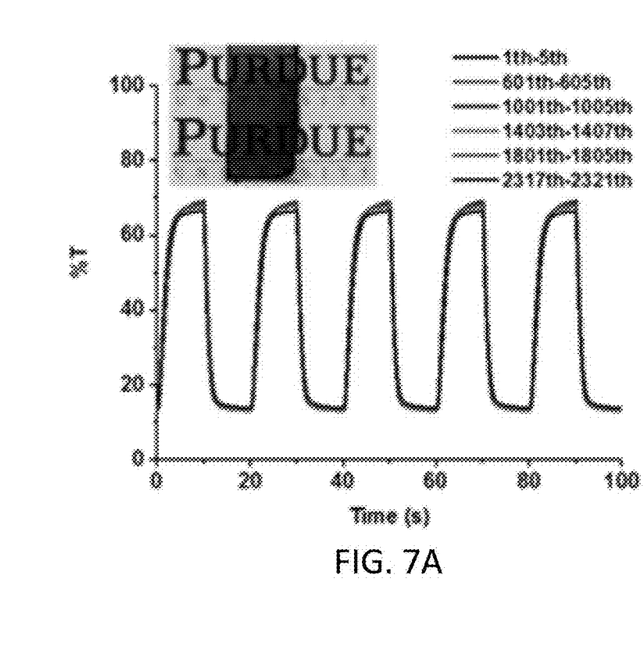
FIGS. 7A-B are diagrams illustrating transmittance of exemplary ECP-Black thin films on a POTS-ITO and a Bare ITO under double potential step chronoamperometric experiments, consistent with exemplary embodiments of the present disclosure.
Figure 7B:
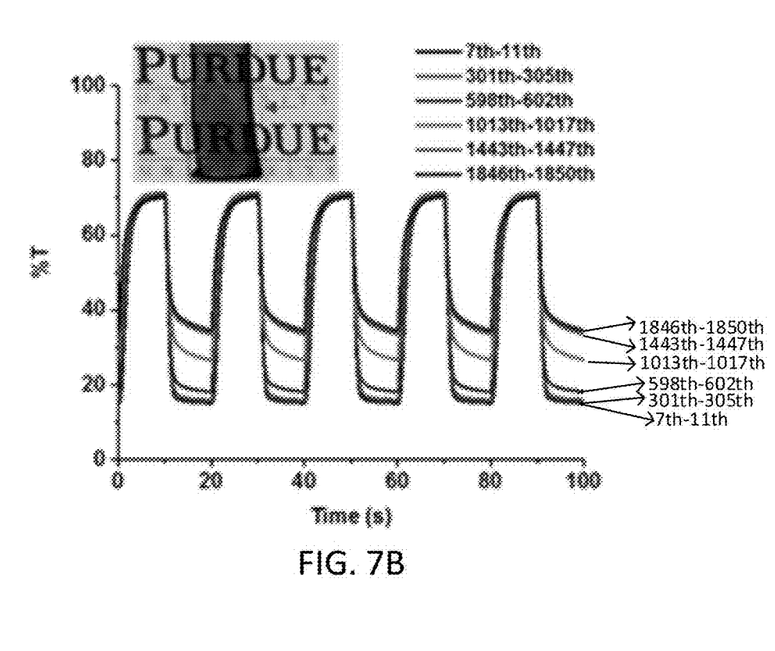

FIGS. 7A-B are diagrams illustrating transmittance at 640 nm of exemplary ECP-Black thin films on a POTS-ITO and a Bare ITO under DPSC experiments, consistent with exemplary embodiments of the present disclosure. In the DPSC measurements, in some embodiments, the potential was switching between −0.2 V and 1.0 V with a 10 s interval. In some embodiments, the optical contrast of ECP-Black thin film on POTS-ITO was maintained up to 2300 cycles with losing only 5% of its original contrast. After ~4300 cycles, most part of the ECP-Black thin film could remain a good adhesion on the POTS-ITO, as shown in FIG. 7A. An inset in FIG. 7A is a photography of the thin film after 4300 cycles. As a comparison, in FIG. 7B, losses of optical contrast can be observed for the ECP-Black thin film on a bare ITO at about 600 cycles, and increased to about 35% loss of its original contrast after about 1800 cycles, indicating the delamination of the thin film. After 3300 cycles, the ECP-Black thin film delaminated from the bare ITO, and was not capable of being fully reduced back to black-blue color as shown in the photograph in FIG. 7B.

In some embodiments, electrochemistry related experiments may be performed using BioLogic SP-150. A UV-vis spectrum and an optical memory which is a kinetic measurement of absorption at certain wavelength may be obtained from Agilent Cary 5000 UV-Vis-NIR spectrophotometer. AFM images may be taken by using the Veeco dimension 3100. Contact Angle measurements may be carried out by using Ramé-Hart Model 790.

In some embodiments, CV experiments may be carried out by using a conventional three-electrode system. Working electrodes may be ITO coated by polymer thin films; the pseudoreference electrode is an Ag wire coated by AgCl; the counter electrode may be a platinum wire; the electrolyte may be 0.2 M $TBAPF_6$ in PC. The thin film of polymer may be made by spin-coating ~0.1 ml of 40 mg/ml solution on top of the ITO with a 1500 rpm/s spin rate to form a film with ~375 nm thick which shows the highest optical contrast. The voltage may be scanned from −0.2 V to 1.0 V at a 40 mV/s scan rate for the ECP-Black and ECP-Magenta, and from −0.2V to 1.3V at a 40 mV/s scan rate for the ECP-Blue. Same set-up and parameters may be also used for the CV cycling stability test. The anodic peak current density in the voltammogram may be used to indicate the cycling stability of the polymer thin film. Moreover, 15 cycles of break-in may be used before the characterizations of the polymer thin films unless otherwise mentioned.

In some embodiments, DPV measurements may be done by using a platinum bottom as a working electrode. A thin polymer layer may be coated on top of the platinum bottom by drop casting the 3-5 mg/ml solution. All other set-ups may be the same as CV experiments. A pulse height of 20 mV, a pulse width of 50 ms, a step height of 1.0 mV, and a step time of 100 ms may be used. The potential range for the experiment may be set between −0.2 and 1.0 V.

In some embodiments, an optical memory may be tested by measuring ΔOD (640 nm) of the thin films under open circuit conditions. The broken-in thin film may be oxidized by applying 1.0 V for 30 s for the ECP-Black and ECP-Magenta, and 1.3 V for 30 s for the ECP-Blue. Then, the optical memory at bleached state may be recorded for 2 mins. Right after 2 mins, a −0.2 V cathodic potential may be applied for certain time (5 s, 10 s, 20 s, 30 s, 60 s, 300 s). Finally, the potential may be switched to voltage off and the optical memories at color state may be recorded for 120 s for short-term measurement, and 900 s for long-term measurement. For the optical memory measurement under the $N_2$ protection, $N_2$ may be pre-purged into the chamber of the Cary 5000 for 30 mins at 10 L/mins before the experiments, and may be continuously supplied in the rest of the experiments.

In some embodiments, EIS experiments may be obtained using a 20 mV perturbation amplitude ($V_{rms}$=14.4 mV) in a frequency range from 1.0 Hz to 1.0 MHz. AFM images may be obtained in a tapping mode at a 0.5 Hz scan rate. The average $R_q$ may be calculated based on three different images.

In this disclosure, we propose two approaches: 1) a fully or partially modified transparent conductive oxide substrate, for example, partially OTS modified ITO, and 2) cathodic polarization, to probe and study the self-bleaching behaviors of the ECP-Black thin films. Accordingly we propose a method to mitigate the self-bleaching problems of ECP thin films with these two approaches. Moreover, such surface modification could increasing the adhesion between EC polymer and the conductive surface. For example, the POTS layer can turn the ITO surface to hydrophobic which provides stronger adhesion to the conjugated polymer thin films. As a result, the cycling stability of the ECP-Black thin film can be enhanced.

In addition, a SAM layer can also be investigated, since it can induce an interface dipole to increase a work function of the ITO, so that the electron transfer at the ITO/ECP interfaces can be completely prevented under $V_{off}$. Also, the adhesion of thin film can be improved on the ITO surface to enhance the cycling stability. By introducing the SAM modified ITO, other aspects including switching time, coloration efficiency, color contrast should be also taken into consideration.

This disclosure could provide instructions on an automation control of electrochromic windows for improving energy saving. Knowing the factors that can control the self-bleaching behaviors, the colored state of the electrochromic windows can be maintained by refreshing cathodic bias at a low frequency and with a minimum energy consumption. This disclosure provides more insight into the self-bleaching behaviors of the ECP polymers and brings the ECP a step forward to practical applications.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. An electrochromic device (ECD) comprising:
a cathodic polarized electrochromic polymer (ECP) film with a densely packed morphology, wherein the ECP film is polarized with a cathodic polarization potential of 0.1 V to about 0.5 V for 60 seconds to 360 seconds; and
a modified transparent conductive oxide substrate including a transparent conductive oxide (TCO) substrate partially covered with a modification material wherein the modification material is selected from $C_6$-$C_{24}$alkyltrichlorosilane, $TiO_2$, ZnO, $WO_3$, $MoO_3$, $V_2O_5$, NiO, $Ni_2O_3$, and $Ni_3O_4$, HMDS (bis(trimethylsilyl)amine), APTS ((3-aminopropyl)triethoxysilane), and trimethoxy(2-phenylethyl)silane, poly(vinylidene fluoride-co-hexafluoropropylene) (PVDF-HFP), poly (3,4-ethylenedioxythiophene)-poly(styrenesulfonate) (PEDOT:PSS), or a combination thereof, and wherein the ECP film is on the modified transparent conductive oxide substrate.

2. The electrochromic device of claim 1, wherein the transparent conductive oxide substrate comprises indium tin oxide (ITO), fluorine-doped tin oxide (FTO), aluminum doped zinc oxide (AZO), or antimony-doped tin oxide (ATO), or a mixture thereof.

3. The electrochromic device of claim 1, wherein the modification material is $C_6$-$C_{24}$alkyltrichlorosilane.

4. The electrochromic device of claim 1, wherein the modification material is octadecyltrichlorosilane (OTS).

5. The electrochromic device of claim 1, wherein the modification material is in the form of a thin layer.

6. The electrochromic device of claim 5, wherein the thickness of a thin layer is less than about 100 nm.

7. The electrochromic device of claim 1, wherein the modification material fully covers the transparent conductive oxide substrate.

8. The electrochromic device of claim 1, wherein the modification material partially covers the transparent conductive oxide substrate.

9. The electrochromic device of claim 1, wherein the coverage of the modification material on the transparent conductive oxide substrate is between about 10% to about 40%.

10. The electrochromic device of claim 1, wherein the ECP film comprises an ECP selected from poly-3,4-ethylenedioxy thiophene (PEDOT), poly-2,2'-bithiophene, polypyrrole, polyaniline (PANI), polythiopene, polyisothianaphthene, poly(oaminophenol), polypyridine, polyindole, polycarbazole, polyquinone, octacyanophthalocyanine, viologen, anthraquinone, phenocyazine, and combinations thereof.

11. The electrochromic device of claim 1, wherein the ECP film comprises an ECP selected from wherein R is $C_1$-$C_{30}$ alkyl, each of x, y and n is independently an integer greater than 0.

12. The electrochromic device of claim 11, wherein R is 2-ethylhexyl, each of x and y is independently an integer from 1 to 12, and n is an integer from 1 to 200.

13. The electrochromic device of claim 1, wherein the ECP film is selected from a group consisting of an ECP-Black film, an ECP-Magenta film, and an ECP-Blue film.

14. The electrochromic device of claim 1, wherein the ECP film is capable of maintaining a colored state for at least 300 seconds or at least 600 seconds.

15. The electrochromic device of claim 1, wherein the ECP film has a cycling stability of maintaining at least 95% of color contrast after 2000 redox cycles or more.

16. The electrochromic device of claim 1, wherein the ECD is a smart window or a display system.

17. The electrochromic device of claim 1, wherein the modification material covers 10% to 40% of the TCO.

18. A method for suppressing a self-bleaching behavior of an electrochromic polymer (ECP) film, comprising:
obtaining a modified transparent conductive oxide substrate including a transparent conductive oxide (TCO) substrate partially covered with a modification material, wherein the modification material is selected from $C_6$-$C_{24}$alkyltrichlorosilane, $TiO_2$, ZnO, $WO_3$, $MoO_3$, $V_2O_5$, NiO, $Ni_2O_3$, and $Ni_3O_4$, HMDS (bis(trimethylsilyl)amine), APTS ((3-aminopropyl)triethoxysilane), and trimethoxy(2-phenylethyl)silane, poly(vinylidene fluoride-co-hexafluoropropylene) (PVDF-HFP), poly(3,4-ethylenedioxythiophene)-poly(styrenesulfonate) (PEDOT:PSS), or a combination thereof;
forming the ECP film on the modified transparent conductive oxide substrate; and
polarizing the ECP film with a cathodic polarization potential of −0.1 V to about −0.5 V for 60 seconds to 360 seconds to form a densely packed morphology of the ECP film.

19. The method of claim 18, wherein obtaining the modified transparent conductive oxide substrate comprising immersing an ITO substrate in an OTS hexane solution for 60 minutes to 15 hours.

20. The method of claim 19, wherein a concentration of the OTS hexane solution ranges from 0.1 vol % to about 10 vol %.

21. The method of claim 18, wherein the polarizing the ECP film is for 300 seconds.

* * * * *